(12) United States Patent
Bryant, Jr.

(10) Patent No.: US 10,888,066 B2
(45) Date of Patent: Jan. 12, 2021

(54) WILDLIFE ACTUATED FEEDER

(71) Applicant: Walter Lebron Bryant, Jr., Columbiana, AL (US)

(72) Inventor: Walter Lebron Bryant, Jr., Columbiana, AL (US)

( * ) Notice: Subject to any disclaimer, the term of this patent is extended or adjusted under 35 U.S.C. 154(b) by 49 days.

(21) Appl. No.: 15/675,733

(22) Filed: Aug. 12, 2017

(65) Prior Publication Data

US 2019/0045743 A1    Feb. 14, 2019

(51) Int. Cl.
*A01K 31/00*   (2006.01)
*A01K 5/02*    (2006.01)
*A01M 31/00*   (2006.01)
A01K 39/012    (2006.01)

(52) U.S. Cl.
CPC ......... *A01K 5/0241* (2013.01); *A01M 31/008* (2013.01); *A01K 39/0125* (2013.01)

(58) Field of Classification Search
CPC .. A01K 5/0241; A01K 39/00; A01K 39/0125; A01K 39/01; A01K 39/0113; A01K 39/012
See application file for complete search history.

(56) References Cited

U.S. PATENT DOCUMENTS

| | | | | |
|---|---|---|---|---|
| 2003/0033985 A1* | 2/2003 | Hardison | ............... | A01K 39/00 119/57.9 |
| 2007/0221133 A1* | 9/2007 | Richmond | ........... | A01K 39/026 119/72 |
| 2008/0035068 A1* | 2/2008 | Gou | ...................... | A01K 39/012 119/72 |
| 2008/0127902 A1* | 6/2008 | Bent | ..................... | A01K 39/012 119/52.3 |
| 2009/0288607 A1* | 11/2009 | Held | .................. | A01K 39/0113 119/52.1 |
| 2015/0173329 A1* | 6/2015 | Barr | ................... | A01K 39/0113 119/52.3 |

* cited by examiner

*Primary Examiner* — Monica L Barlow
(74) *Attorney, Agent, or Firm* — Christopher R. Ganter, LLC; Christopher R. Ganter

(57) ABSTRACT

The invention is a wildlife feeder comprising a support line, a reservoir, a base, a regulator, a spring designed to secure said regulator in said base, a tether attachable to said regulator and a stake such that the stake is installed in the ground to created a taut connection of the wildlife feeder with the ground. The wildlife feeder is wildlife actuated and can be customized to meter feed out to animals in a desired way given the targeted animals to feed and animals to be prevented from actuating the feeder. The spring is coupled with the regulator such that it exerts an upward force on the regulator which abuts it against an annular seat in the base. When an animal exerts force on the feeder the regulator is opened by compression of the spring and feed is metered out. There is also disclosed an optional feed tray that is either unitary with the regulator or attachable to the regulator such that feed that is dispensed lands on the feed tray for eating or dispersing by animals.

24 Claims, 12 Drawing Sheets

WILDLIFE ACTUATED FEEDER

FIELD OF THE INVENTION

The invention relates to an inconspicuous wildlife feeder that is actuated by a wildlife applied or natural applied force against a feeder that causes feed to dispense and said feeder is suspended off the ground and displays feed to wildlife in both a visual and olfactory fashion such that a wildlife will be inclined to apply force to the feeder to reach the feed.

BACKGROUND OF THE INVENTION

There are many wildlife feeding devices in the prior art including those feeding devices that allow an animal to actuate the feeder. Many of the feeding devices are overly large and burdensome to handle and load with feed without use of some type of motorized vehicle. Additionally, these feeding devices are open and obvious to wildlife and people alike such that other people are tempted to remove and steal said feeding devices and wildlife are weary of the feeding devices due to their shape and size. Many of the devices are either timed motorized feeding devices or feed at will devices that require no intelligence or strength to actuate the devices. One deficiency of timed feeding devices involves the problem of animals patterning the feeder's feed periods and quickly depleting the feed that has been dispensed. A deficiency of at-will feeding devices is they allow for all sorts of wildlife to partake of the feed provided such that it is quickly diminished and the target wildlife species that a user wishes to supplement are out of a feed supply until it is replenished. While there are demand feeders in the art, none are adjustable to multiple species.

What is needed in the art is a wildlife feeder designed to blend in with a forest environment and be inconspicuous to animals and humans, have no electronic components and minimal mechanical components, have a simple yet effective way of deploying and supporting said feeder, and have a contained feed source that an animal can either see or smell but is unavailable to the animal without their exertion of an intentional or incidental force upon the feeder. The wildlife feeder has operational characteristics that require minimal maintenance of any feed dispensing parts, has species selectable characteristics, can be height adjusted so that only certain size animals can utilize said feeder, has tension adjustable means to control the amount of force required to actuate said feeder, is very quiet in operation, geometrically blends in amongst its intended environment and is highly portable in rough terrain for remote location of said feeder.

SUMMARY OF THE INVENTION

The invention is a wildlife feeder and wildlife feeder kit having a reservoir attachable to a base. The feeder is designed to be vertically suspended from a tree limb or other structure by use of a support line suspended over a tree trunk or limb and secured to a tree trunk or limb. The base is generally cylindrical in shape and is adapted to attach to the base. Inside the base there is an annular seat whereby a regulator is installed into a bottom opening of the base and inserted into the hollow interior space of the base such that the bottom outer edge of the regulator abuts against said bottom edge of said annular seat whereby the top portion of the regulator is located above the annular seat. The regulator has a generally conical shape in its lower region with longitudinal fluted channels on its outer surface. A tapered spring is installed on its bottom edge onto the upper surface of the annular seat. The top terminal portion of the spring has a straight portion that is bent 90 degrees to the helical path of the spring. Located in the top of the regulator is a slot and a plurality of apertures.

The straight portion of the spring is inserted into the slot of the regulator, the spring is compressed downward, and a pin is inserted through one of the apertures and above the straight portion of the spring. The resulting configuration is a spring that is under compression that exerts an upward force by way of the straight portion pressing against the pin which in turn exerts upward force on the regulator such that the regulator is sealed against the bottom edge of the annular seat such that feed is trapped in the feeder. A tether is attached to either the bottom of the regulator or to the pin and is staked to the ground such that there is a taut connection between the ground and the regulator. This configuration allows feed that has been loaded into the reservoir to remain trapped inside the reservoir unless an outside force is applied to the feeder which allows the regulator to pivot and/or drop below the annular seat causing feed to pass through the longitudinal fluted channels.

As stated, the wildlife feeder is actuated by wildlife whether they be primary species or secondary species. With regards to deer hunting, often hunters will place a feeder close to an area they desire to hunt. The deer themselves, as a primary species from the standpoint of a deer hunter, can readily actuate the feeder by pushing or nudging the feeder, however, other secondary species such as squirrels, raccoons and various birds actuate the feeder and cause it to dispense feed upon the ground thereby further serving the primary species.

Specific advantages and features of the present assembly will be apparent from the accompanying drawings and the description of several illustrative embodiments of the present invention.

It should be understood that the present drawings are not necessarily to scale and that the embodiments disclosed herein are sometimes illustrated by fragmentary views. It should also be understood that the invention is not necessarily limited to the particular embodiments illustrated herein.

DETAILED DESCRIPTION

The invention is generally depicted in FIGS. 1-30 but may be embodied in various other forms. The principles and teachings of the invention, therefore, can be applied to numerous alternative variations.

Figure 1:
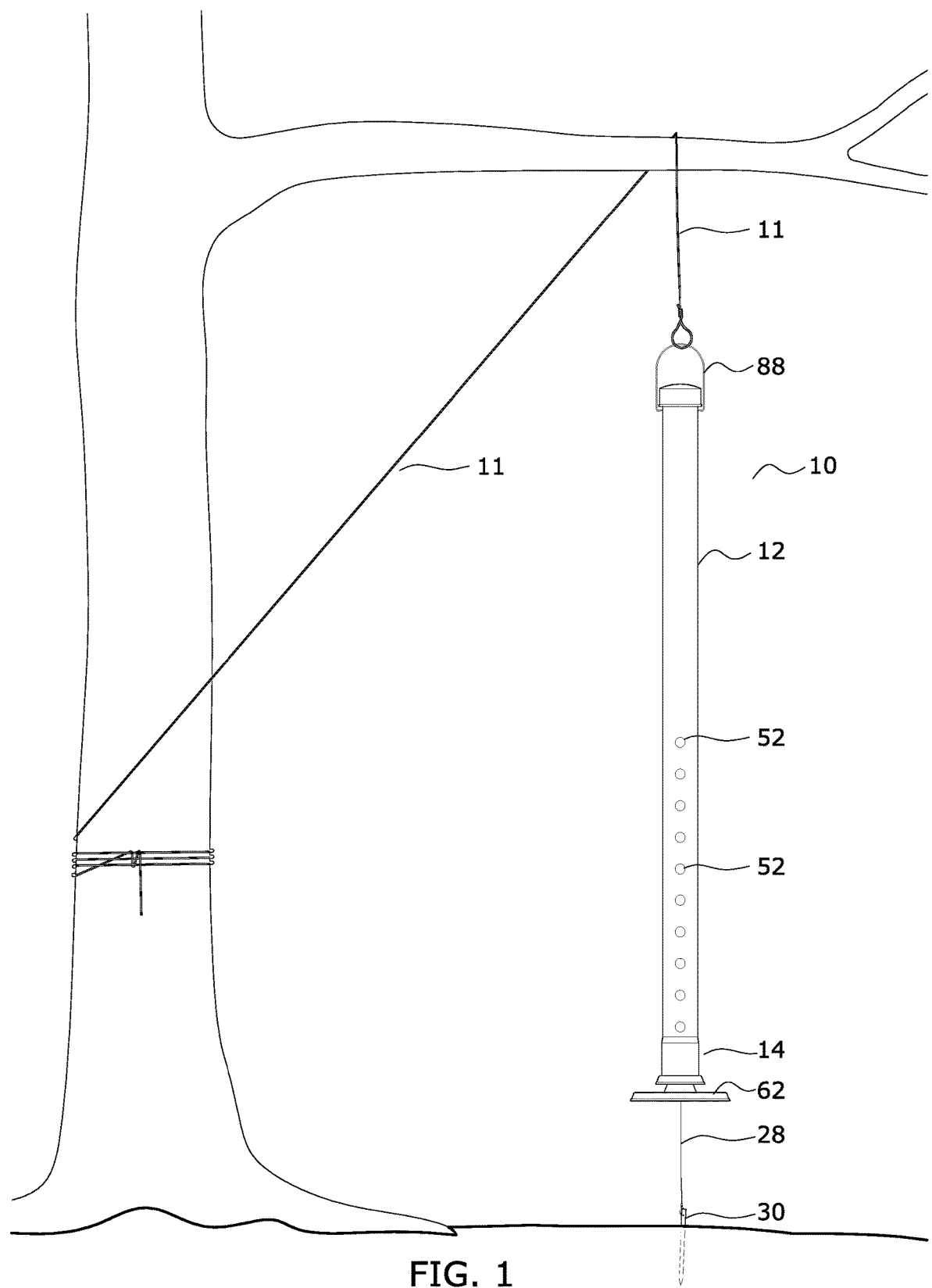
FIG. 1 is a perspective view of the wildlife feeder deployed in feeding zone.
Figure 2:
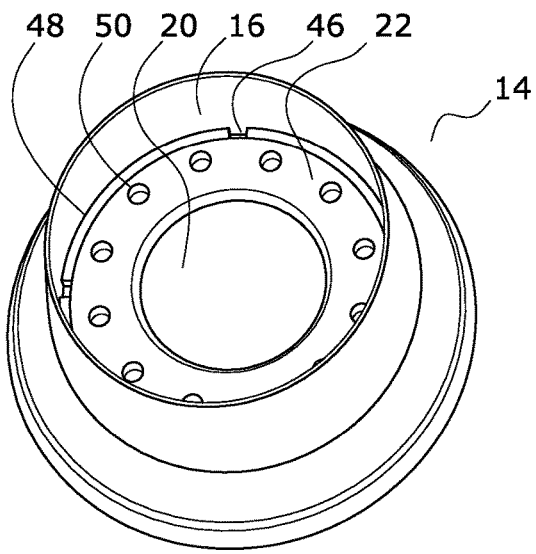
FIG. 2. is a perspective view of the base.
Figure 3:
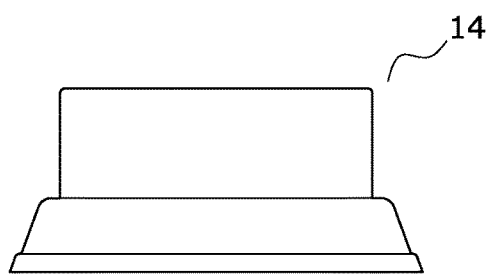
FIG. 3. is a side elevation of the base.
Figure 4:
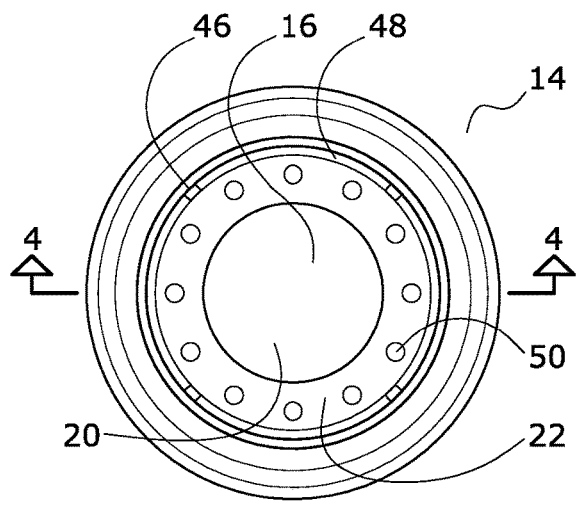
FIG. 4 is a top plan view of the base.
Figure 5:
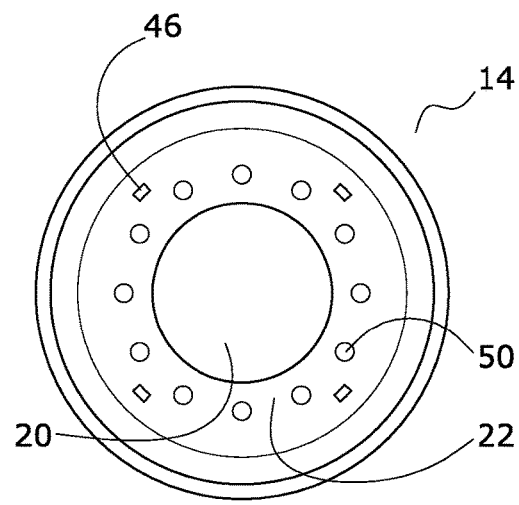
FIG. 5 is a bottom plan view of the base.
Figure 6:
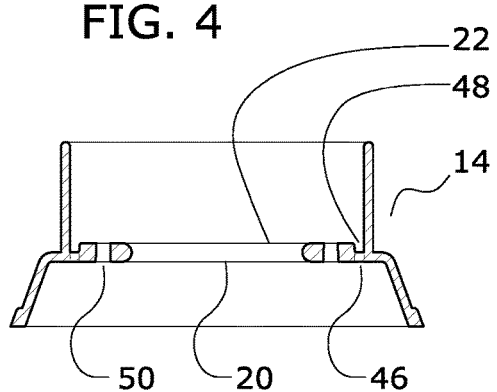
FIG. 6 is a cross section of the base along the line 4-4 as shown in FIG. 4.
Figure 8:
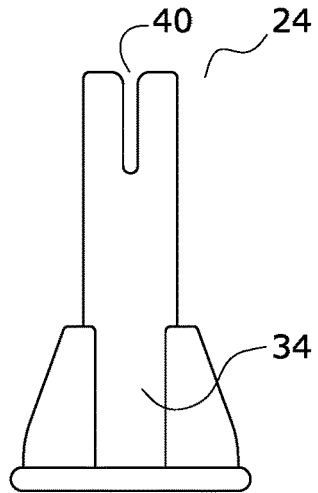
FIG. 8 is a side elevation of the regulator.
Figure 7:
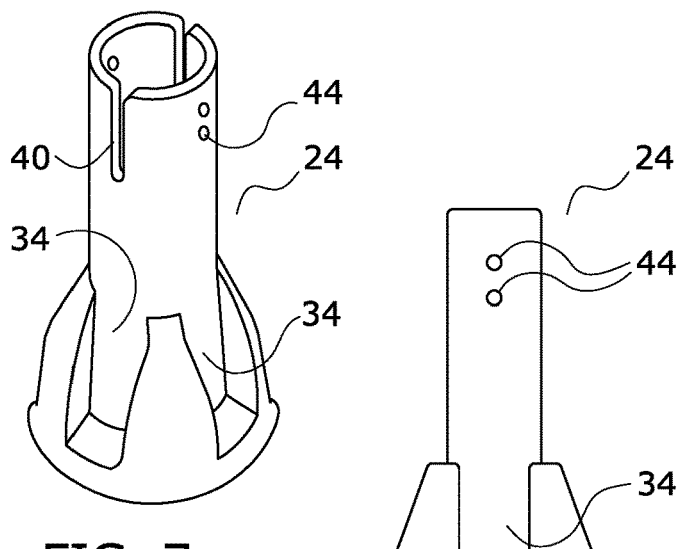
FIG. 7 is a perspective view of the regulator.
Figure 8A:
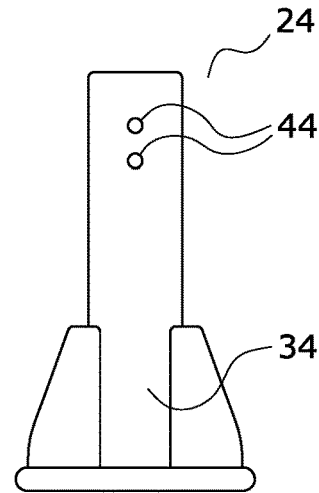
FIG. 8A is a side elevation of the regulator rotated 90 degrees from the view shown in FIG. 8.
Figure 9:
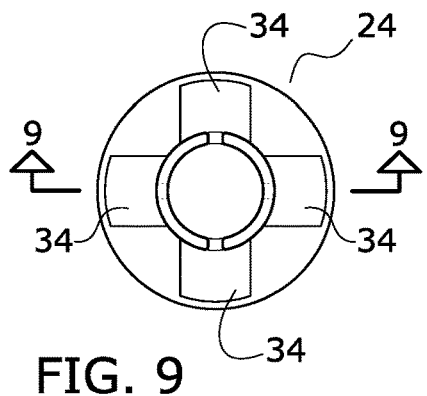
FIG. 9 is a top plan view of the regulator.
Figure 10:
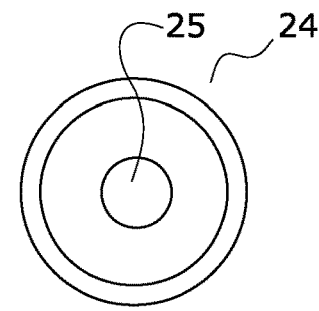
FIG. 10 is a bottom plan view of the regulator.
Figure 11:
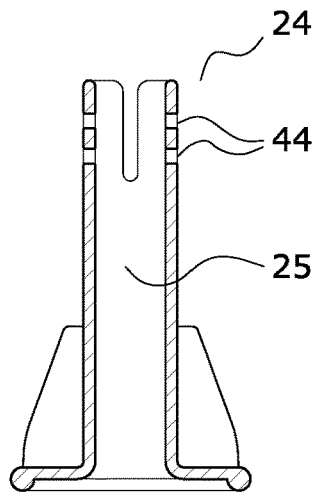
FIG. 11 is a cross sectional view of the regulator along the line 9-9 as shown in FIG. 9.
Figure 11A:
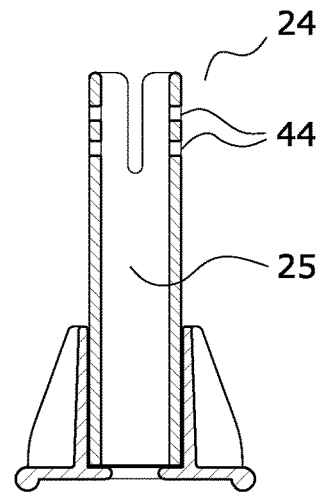
FIG. 11A is a cross sectional view of the regulator along the line 9-9 as shown in FIG. 9.
Figure 19:
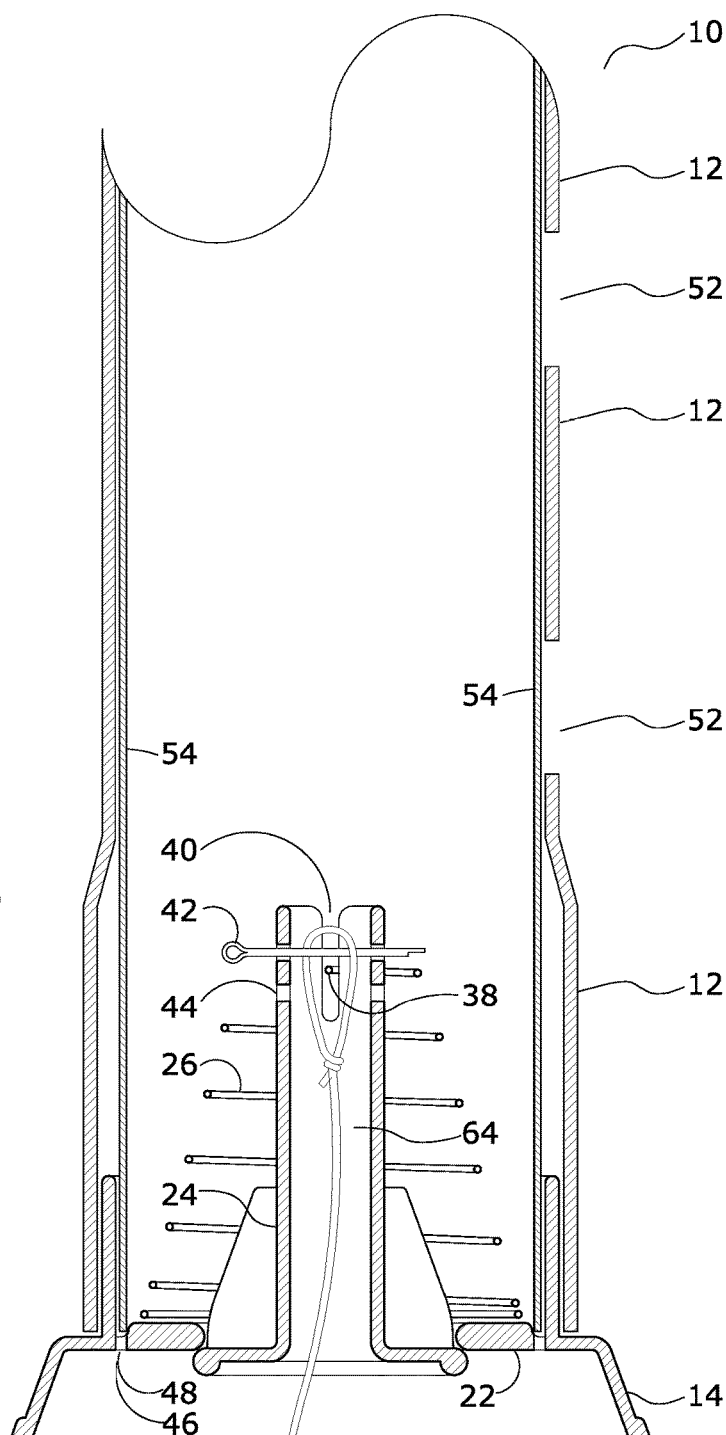
FIG. 19 is a cross sectional view along the line 17-17 of the feeder in one embodiment.
Figure 20:
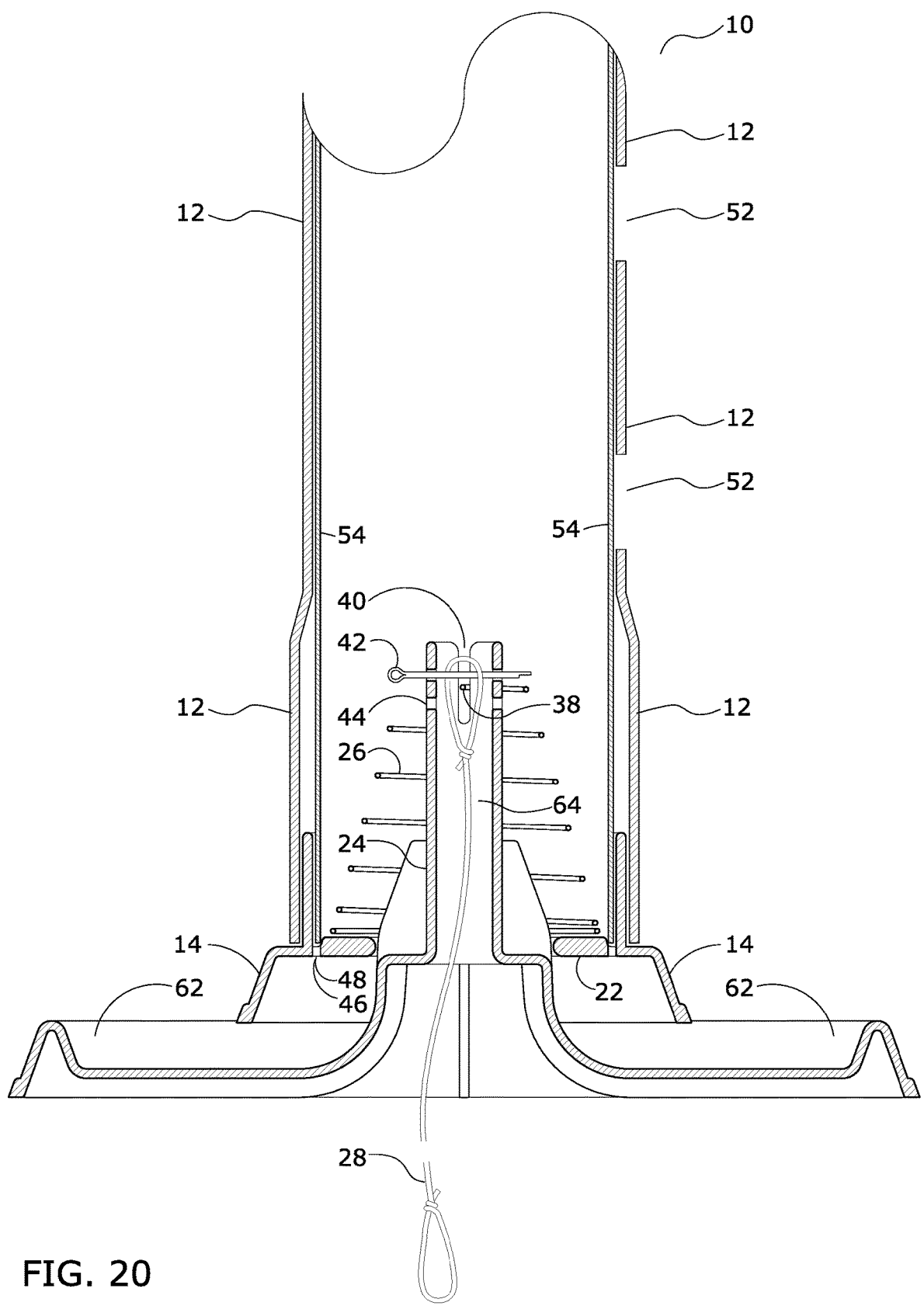
FIG. 20 is a cross sectional view of an alternate embodiment of the wildlife feeder along the line 18-18.

Referring now to FIG. 1 there is shown the feeder 10 suspended from a tree limb using means for supporting said feeder 10. As shown, one means is a support line 11 extended over a tree limb and tied to the trunk of the tree. Another means would be using a winch with a support line 11 such that the feeder 10 can be raised and lowered whether the feeder 10 is loaded or unloaded. In one embodiment, the support line 11 is attached to a bail 88 which is itself attached to a reservoir 12. The reservoir 12 is fitted on top of a base 14 and attached thereto by fasteners such as screws or bolts. The base 14 can be pre-tapped with fastener apertures in one embodiment for attachment of the reservoir 12 onto the base 14 with a screw or bolt. The reservoir 12 in one embodiment can further have sight apertures 52 located in its sidewall such that an individual can observe the feed level in the reservoir 12 and refill accordingly. Abutted against said base 14 is a feed tray 62 in one embodiment of the invention. A tether 28 is attached on one end to a regulator 24 as shown in FIGS. 19 & 20 and to a stake 30 on its other end. The support line 11 and tether 28 can be used in conjunction to adjust the height of the feeder 10 such that is custom positioned for certain animals. A further customization is using various tethers 28 such as rope, monofilament, cord, cable, plastic coated cable, chain and other such similar materials that would aid to prevent certain animals from climbing the tether 28 or by using materials that will promote an animal climbing. A slippery plastic or vinyl coating on any of the above-mentioned materials would in many cases prevent an animal from climbing or tugging on the tether 28. The stake 30 could be made of wood, metal, composite or any other rigid material that would allow secure insertion into the ground of the stake 30.

Referring now to FIGS. 2-6, there is shown the base 14. The base 14 is integral to the operation of the feeder as the reservoir 12 is attached to the base 14 on its upper surface and all feed is metered through said base 14. The base 14 has an upper opening 16, a hollow interior space 20 adjacent to an annular seat 22. There is also shown an annular channel 48, weep holes 46, and scent apertures 50. The annular channel 48 is adapted to accept an optional transparent or translucent tubular sleeve 54 as shown in FIG. 20 that can seat in the annular channel 48. The base 14 can be formed out of plastic, wood, metal, carbon fiber, synthetic resins or any other rigid material.

Figure 16:
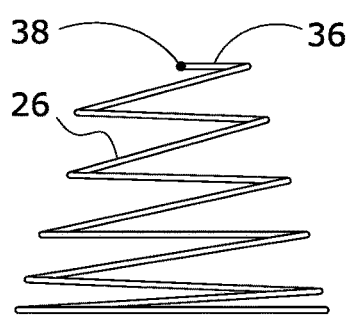
FIG. 16 is a side elevation of the spring.
Figure 16A:
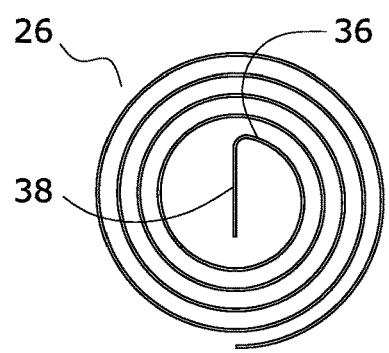
FIG. 16A is a top plan view of the spring.

Referring now to FIGS. 7, 8, 8A, 9, 10, 11 and 11A, there is shown a regulator 24 having a plurality of longitudinal fluted channels 34. The upper portion of the regulator 24 is tubular and the lower portion is conical or frusto-conical in shape and having alternating longitudinal fluted channels 34. Also shown in the regulator 24 is a slot 40 and apertures 44. There is also a hollow longitudinal channel 25 located through said regulator 24. The regulator 24 is designed to be installed up through the lower opening 18 of the base 14. The lower conical portion of the regulator 24 is designed to abut against the annular seat 22 of the base 14. Once the regulator 24 is positioned inside the base 14 and against the annular seat 22, the regulator 24 is secured in position using a spring 26 as shown in FIGS. 16 & 16A and more fully described below.

Figure 12:
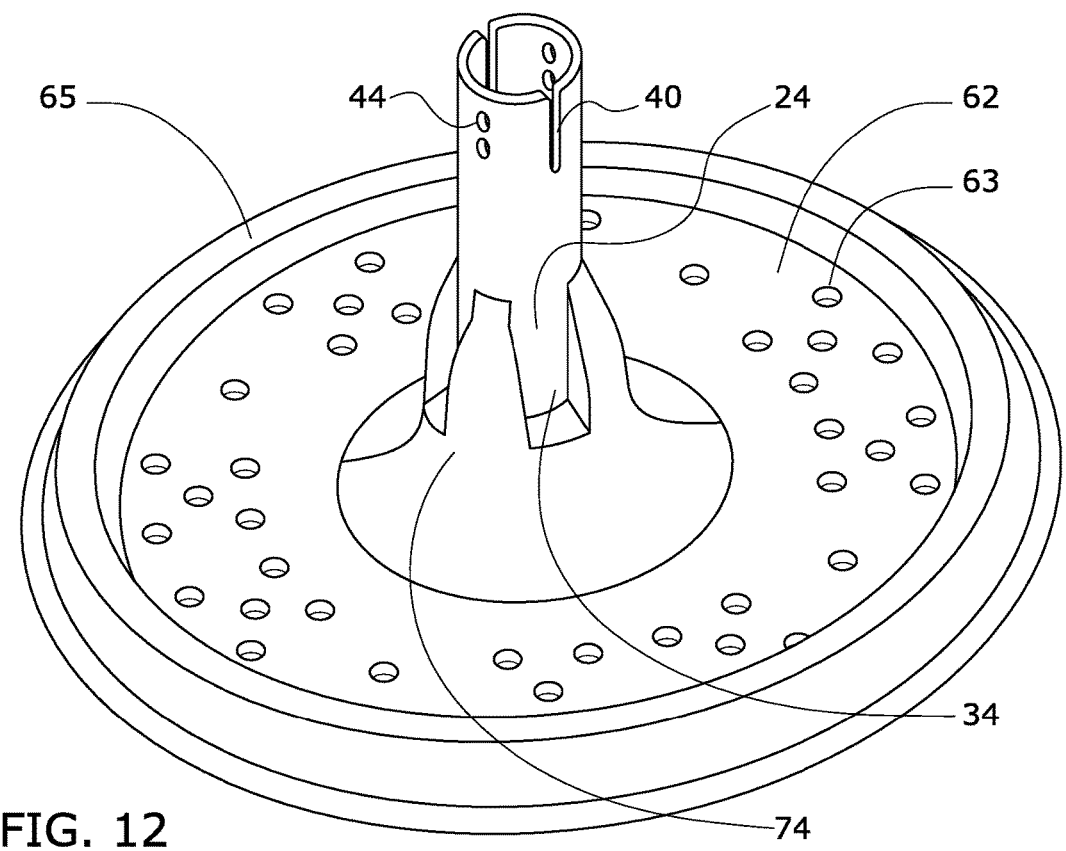
FIG. 12 is a perspective view of the regulator tray.
Figure 13:
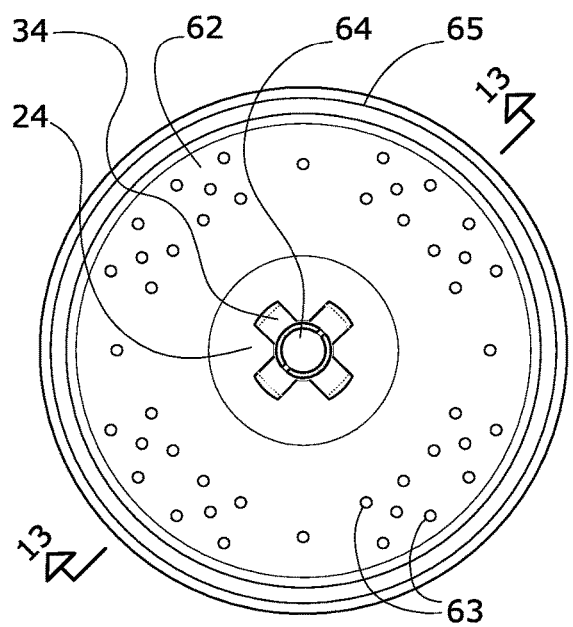
FIG. 13 is a top plan view of the regulator tray.
Figure 13A:
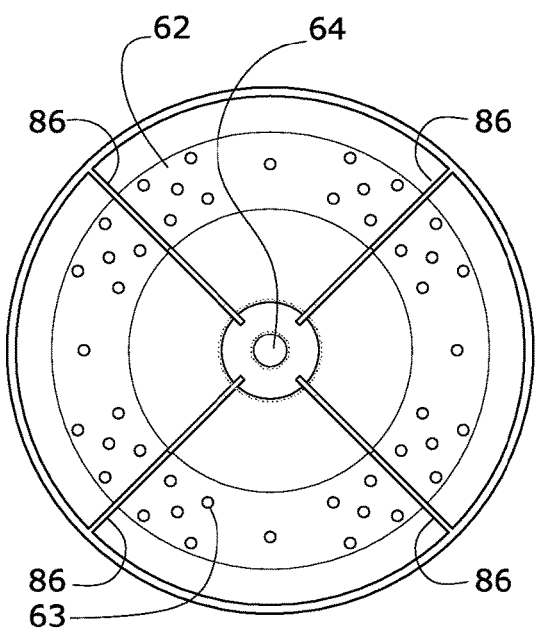
FIG. 13A is a bottom plan view of the feed tray.
Figure 14:
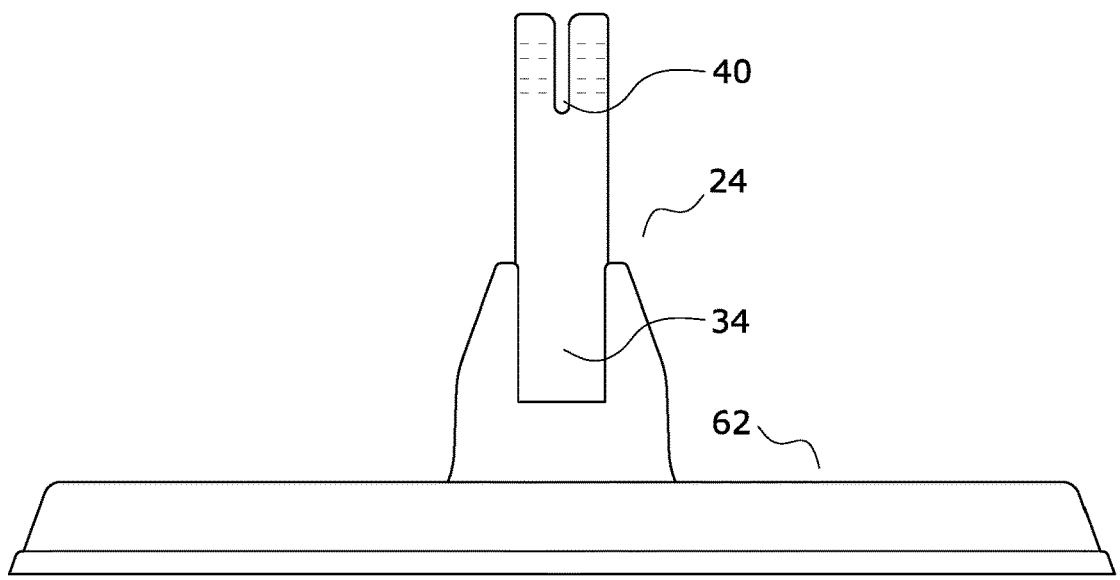
FIG. 14 is a side elevation of the regulator tray
Figure 15:
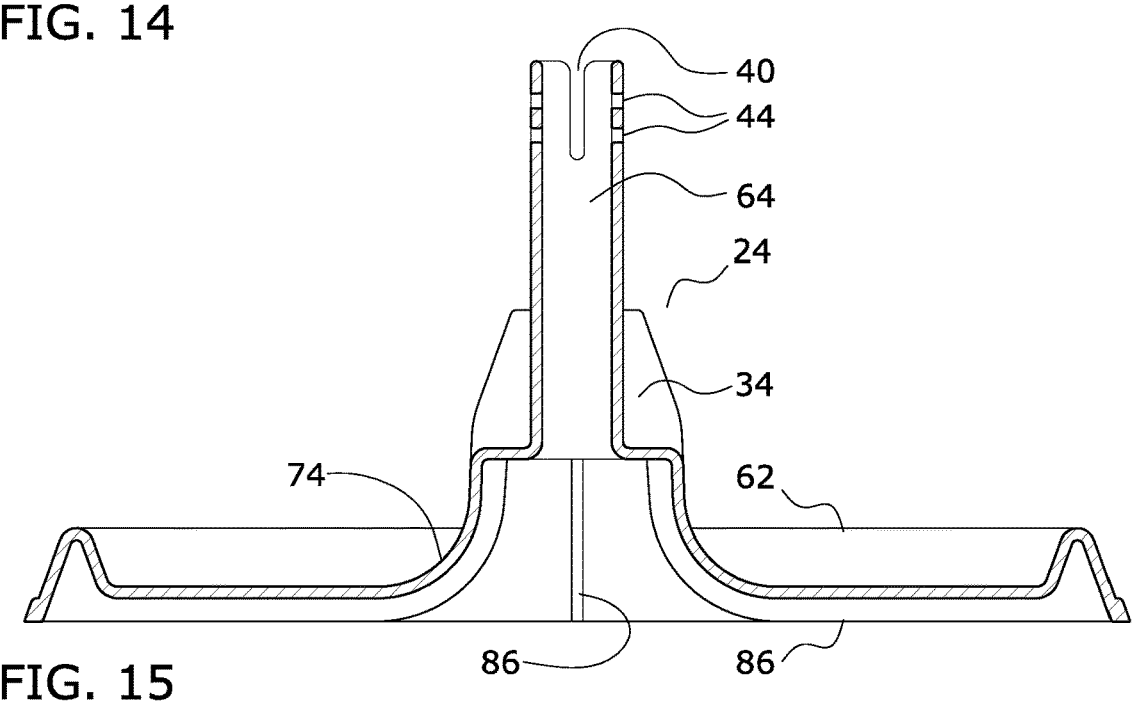
FIG. 15 is a cross sectional view of the regulator and feed tray along line 13-13 as shown in FIG. 13.

Referring to FIGS. 12, 13 and 13A there is shown an alternate embodiment of the regulator 24 whereby a feed tray 62 formed onto the regulator's 24 lower surface such that the regulator 24 and feed tray 62 are a unitary piece and have a hollow vertical channel 64. There is a conical protruded portion 74 rises out of the feed tray 6 where the regulator 24 is formed. In another embodiment, the upper portion of the regulator 24 can be a tube that is inserted into the conical protruded portion 74 and fastened with a screw or bolt. The feed tray 62 promotes retention of feed on its surface such that it allows birds and squirrels the ability to feed on said feed tray 62 while also actuating the regulator 24 to allow subsequent feed to slip through the longitudinal fluted channels 34 of the regulator 24 where it meets the annular seat 22 of the base and accumulate on the feed tray to ultimately entice primary species for further engagement of the feeder 10. The feed tray 62 further contains drain holes 63 that allow water to drain off the feed tray 62 such that feed does not become spoiled. Also shown on the feed tray 62 is a rigid annular lip 65 on the outer edge of the feed tray 62 which acts as a barrier to prevent feed from falling off of the feed tray 62 and also acts a perch for birds and squirrels. FIG. 13A shows the bottom underside of the feed tray 62 and specifically shows ribs 86 which stabilize the feed tray 62 and gives it rigidity which prevents unwanted flexing of the feed tray 62 to assure that all applied force is transferred to the spring 26.

FIGS. 16, 16A, 19 and 20 show a spring 26. In one embodiment, the spring 26 is helical in shape and has a taper which accommodates the taper of the regulator 24. Also shown is the top terminal end 36 and a straight portion 38 of the spring 26. The spring 26 is designed to be placed on its bottom edge on the annular seat 22 of the base 14. The straight portion 38 of the spring is adapted to be inserted into the slot 40 located in the upper tubular portion of the regulator 24. Once this is performed the spring 26 must be compressed such that a pin 42 is installed into one of said apertures 44 in the upper tubular portion of the regulator 24 and the straight portion 38 of the spring 26 is trapped in a compressed position below the pin 42. The slot 40 allows the straight portion 38 to travel up and down in the slot 40 for compression of the spring 26. The straight portion 38 of the spring 26 exerts an upward force on the pin 42 which in turn exerts an upward force on the regulator 24 which in turn creates a tight connection between the regulator 24 where it touches the annular seat 22 of the base. To dispense feed, the regulator 24 must be dislodged from its position against the annular seat 22 such that feed can flow through the longitudinal fluted channels 34 located on the regulator 24. This is accomplished by an animal touching and nudging the feeder 10 base 14 or feed tray 62 or an animal exerting force on the tether 28. The tension of the spring 26 can be controlled in a number of ways. The spring 26 in one embodiment can be made of metal and the gauge of the spring 26 can be thickened or thinned to give it a desired strength. Additionally, the spring 26 strength can vary by having more or less coils Further, apertures 44 located on the upper tubular portion of the regulator 24 are in an ascending or descending configuration such that use of a lower aperture 44 will cause the spring 26 to exert more tension against the regulator 24. Use of a higher aperture 44 will cause the spring 26 to exert less tension against the regulator 24 than would a lower aperture 44. The spring 26 serves multiple functions. The spring 26 maintains the regulator 24 in a closed position in the absence of applied force and thereby prevents feed from escaping the reservoir 12. The spring 26 also serves to absorb the shock of excessive force that an animal may apply to the feeder 10 thereby dampening and preserving the integrity of the feeder 10. The spring 26 will react to subtle forces such as wind to maintain the surrounding feed contents loose to readily flow. The spring 26 compresses in the direction of outflow thereby forcing feed outward in simultaneous conjunction with the activation of the regulator in response to external forces applied to the suspended feeder 10. An external horizontal or vertical force on the feeder 10 will cause the spring to compress due to the feeder secured to the ground by the tether 28 and stake 30 as this is the only direction the regulator 24 and spring 26 can give because the abutment of the regulator 24 against the annular seat 22. The feeder 10 acts as a lever arm to applied lateral forces that creates a vertical reaction force in the spring 26 regulator 24 and base 14 assembly that thereby releases feed through longitudinal fluted channels 34, and if enough force is applied, feed flows out around the entire regulator 24 as enough space is created between the regulator 24 and annular seat 22.

Figure 17:
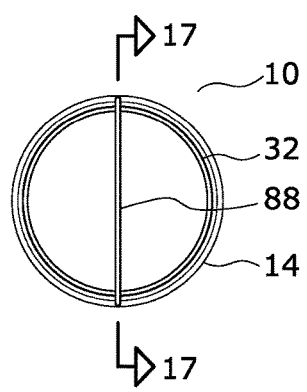
FIG. 17 is a top plan view of the feeder.
Figure 18:
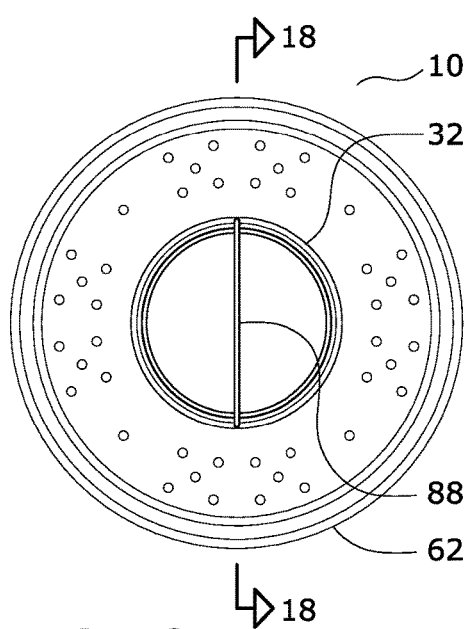
FIG. 18 is a top plan view of an alternate embodiment of the feeder.

FIG. 17 and FIG. 19 depict a sectional view of one embodiment of an assembled feeder 10. FIG. 17 depicts the feeder 10 with cap 32, base 14 and a bail 88 that is used to suspend the feeder 10 by attachment to the reservoir 10. FIG. 19 illustrates the reservoir 12 having sight apertures 52 in its sidewall and is mounted onto the base 14. Further shown is a tubular sleeve 54 inserted into the upper opening of the base 14 and resting in the annular channel 48 in the base. The tubular sleeve 54 in a preferred embodiment is either transparent or translucent and in combination with the sight apertures 52 in the reservoir 12 sidewall allows a user to easily check the amount of feed remaining in the feeder 10. This configuration allows for viewing of the feed level while also maintaining a dry environment for the feed. Should moisture or precipitation try to enter through the sight apertures 52, it will merely travel downward on the outer surface of the tubular sleeve 54 and make its way to the ground by way of the annular channel 48 which will in turn funnel the water to the weep holes 46 located in the annular channel 48. A further benefit of the sight apertures 52 and tubular sleeve 54 is that they allow air to enter the reservoir 12 and aid in ventilating the reservoir 12 and keeping the feed from getting hot and being broken down via biological processes. In an alternate embodiment, there would be no sight apertures 52 located in the reservoir 12 nor a tubular sleeve 54 installed into the base 14 as a user could just tap on the reservoir 12 to get an idea of the feed level based on the sound reported.

FIG. 19 also depicts an installed regulator 24 and spring 26 in the base 14. As can be seen, the bottom of the spring 26 is placed on the annular seat 22. The straight portion 38 is inserted into the slot 40 on the top of the regulator 24. The spring 26 is compressed and a pin 42 is placed through one of a number of apertures 44 located in the upper tubular portion of the regulator 24 such that the straight portion 38 rests below the pin 42. Further shown is a hollow vertical channel 64 located in the regulator 24 which allows for a tether 28 to be inserted there through and attached to said pin 42.

Similar to FIGS. 17 & 19, FIGS. 18 & 20 depict an alternate embodiment of the feeder whereby the regulator 24 has a feed tray 62 formed onto its lower portion. The feed tray 62 allows for feed to deposited on the feed tray 62 and suspended off the ground. This allows for a smaller animal to perch on the feed tray 62 to eat the feed or to act as actuator of the regulator 24 to dispense more feed to entice and serve larger animals. Alternatively, animals such as deer can eat directly off of the feed tray 62 to intentionally or inadvertently actuate the regulator 24 to release more feed which falls onto the feed tray 62 and then off the feed tray 62 and onto the ground. Smaller animals such as birds and squirrels can act as physical dispensers of the feed on the feed tray 62 towards the ground which is where many animals such as deer prefer to eat. This is achieved by using a special formulated blend of feed. For example, a certain blend of bird seed could be placed in the feeder 10 with whole corn. Many birds or squirrels or other small animals would target the bird seed on the feed tray 62 and disregard and/or discard the corn as they peck and paw at the bird seed. Oftentimes this means that the corn in the given example is dispersed off the feed tray 62 and onto the ground a distance away from the feeder 10 but still in the vicinity of the feeder 10. This allows a broader dispensing of the feed onto the ground than if the feeder 10 just dispensed to the ground directly below the feeder 10. One advantage to this approach is that it allows for more simultaneous feeding of a game animal given that the wildlife such as birds and squirrels act as a broadcaster of the feed and disperse the feed to a greater surface area on the ground which allows more physical space for multiple animals to feed simultaneously without fear of competition. This can also aid in bringing in cautious animals as they are sometimes intimidated from feeding too close to a man-made structure such as a feeder 10.

Figure 21:
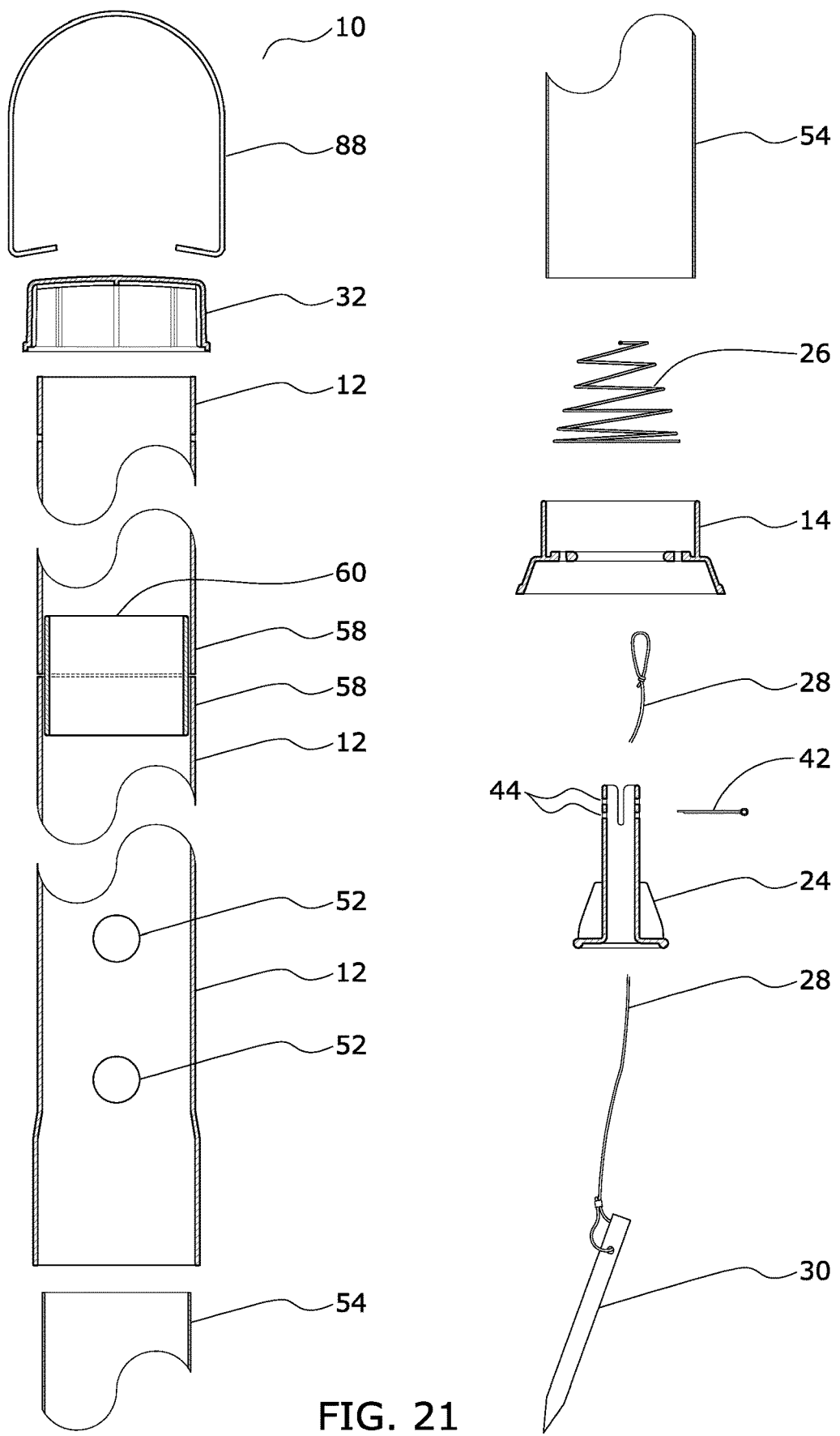
FIG. 21 is an exploded cross-sectional view of the feeder along the line 17-17.
Figure 22:
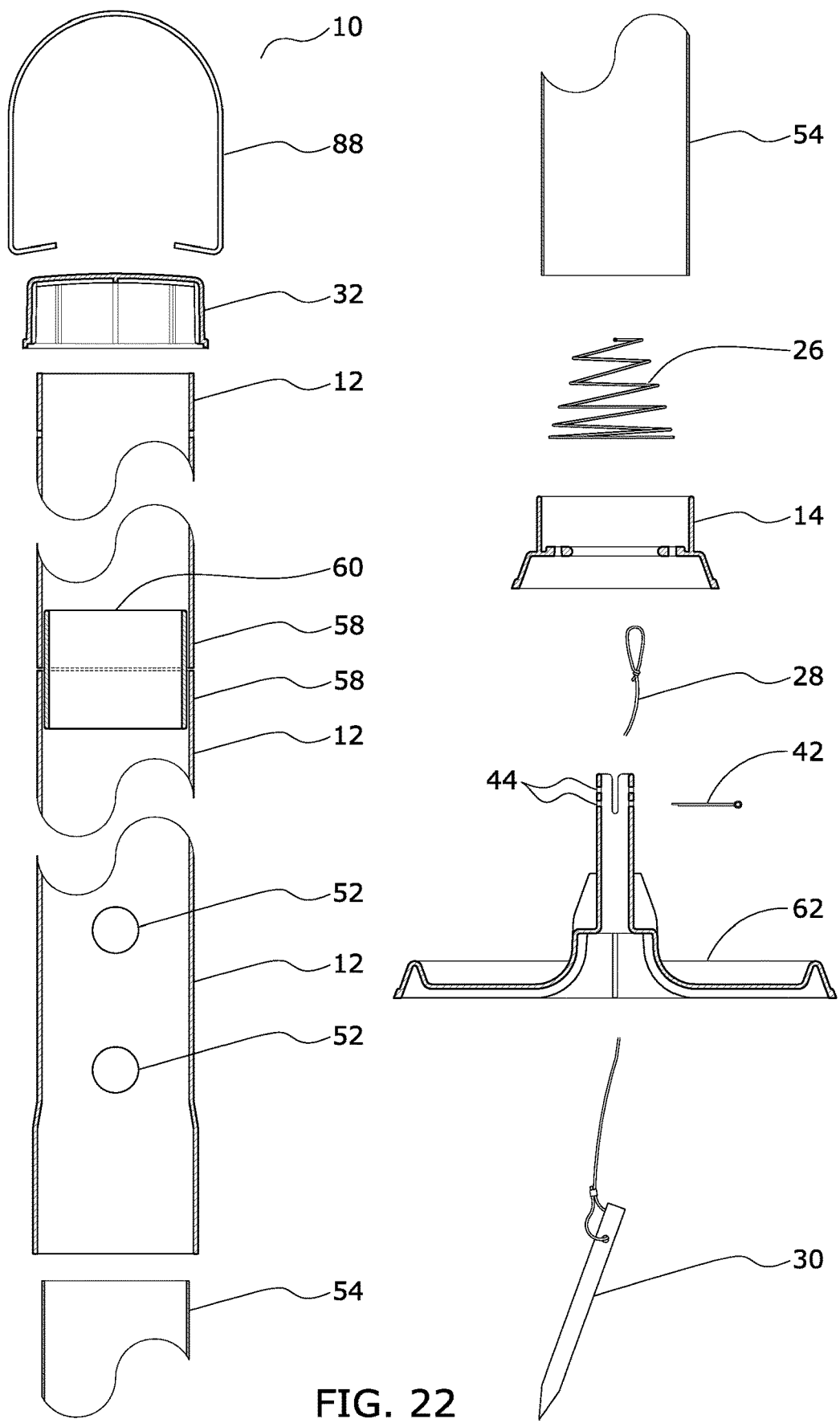
FIG. 22 is an exploded cross-sectional view of an alternate embodiment of the wildlife feeder along the line 18-18.
Figure 23:
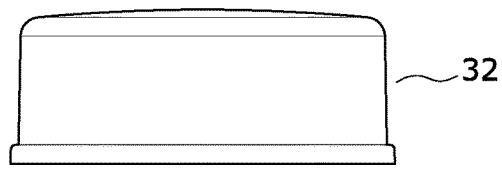
FIG. 23 is a side elevation of the cap.
Figure 24:
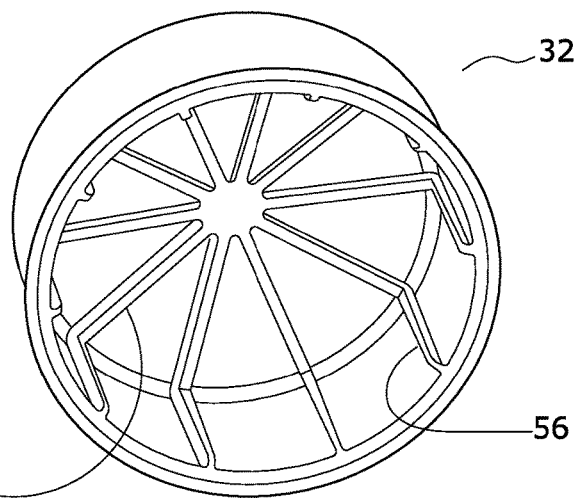
FIG. 24 is a perspective view of the cap.
Figure 25:
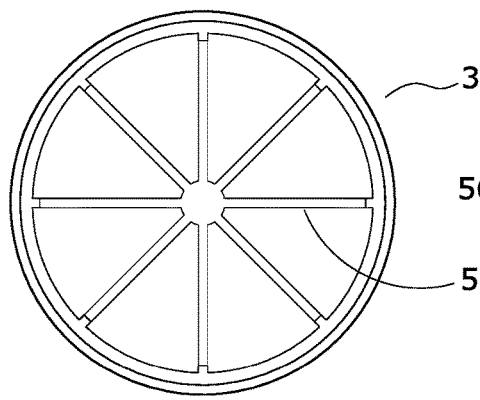
FIG. 25 is a bottom plan view of the cap.
Figure 26:
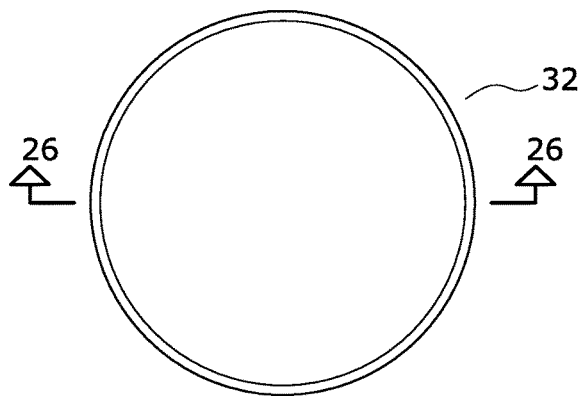
FIG. 26 is a top plan view of the cap.
Figure 27:
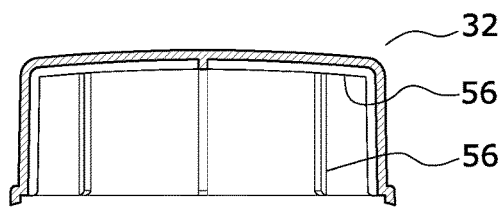
FIG. 27 is a cross sectional view of the cap along the line 26-26.
Figure 28:
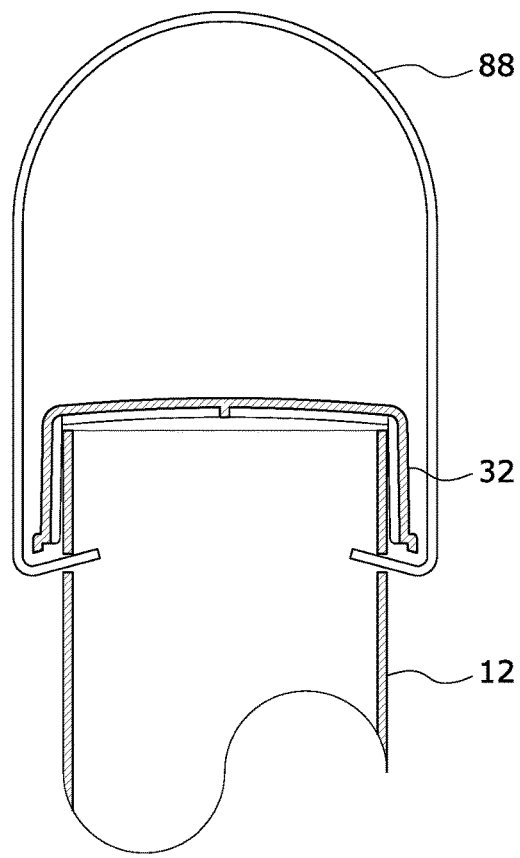
FIG. 28 is a cross-sectional view of the upper portion of the feeder along the line 17-17 as shown in FIG. 17.

Referring now FIGS. 21 & 22 there are shown two different sectional exploded views of different embodiments of the feeder 10. Shown in both FIGS. 21 & 22 are reservoir sections 58 and couplings 60. In one embodiment, the reservoir 12 can be eight to ten feet long. In a preferred embodiment, the reservoir 12 is made of PVC pipe or other similar tubular materials. This can be achieved by using a single PVC (poly vinyl chloride) pipe section for the reservoir 12 or to use smaller PVC reservoir sections 58 that are joined together using couplings 60 that are sleeves of slightly smaller diameter PVC than the reservoir 12 PVC that fit inside two adjoining reservoir sections 58. Means for securing the reservoir sections 58 together using the couplings 60 could fasteners such as screws or bolts or various adhesives, or by using threaded couplings 60 and reservoir sections 58. This allows for easier mobility of the feeder 10 when transporting it into remote areas as the reservoir sections 58 are more easily consolidated into a pack or container for transport.

The current invention can also be a kit made available to users such that they complete the feeder 10 by obtaining readily available everyday items at a variety of stores or through the internet With the exclusion of the base 14, the regulator 24, the spring 26, and alternately a unitary regulator 24 feed tray 62 combination as shown in FIG. 21, every other item of the feeder can be sourced from local stores or through the internet by a user. However, a specialized vented cap 32 as shown in FIGS. 23-28 and discussed more fully below could not be sourced at a local store but a user could utilize a standard non-vented PVC pipe cap 32. The tether 28, stake 30, support line 11, bail 88, reservoir 12, reservoir sections 58, couplings 60, tubular sleeve 54, standard cap 32, forming sight apertures 54 in the reservoir 12 or reservoir sections 58, and providing fasteners are all items and steps that any user can procure independently. This would aid greatly in transportation and shipping costs associated with distributing the feeder 10 and in purchase price for a consumer.

Referring now to FIGS. 23-28 there is shown a vented cap 32 that is used to seal the reservoir 12 to prevent weather and animals from accessing feed stored in the reservoir 12. Generally, a standard PVC pipe cap can be utilized as the cap 32, but for optimum results a unique vented cap 32 is used. As shown the cap 32 has ribs 56 on its inner surface. The ribs 56 engage the reservoir 12 in a snug frictional connection thereby allowing the open space between the ribs to be in communication with the interior of the reservoir 12. This allows the reservoir 12 to vent and circulate air throughout keeping the feed fresher for longer and especially in warmer climates. Further, the cap 32 allows the reservoir to emit the smell of feed which animals smell and are drawn to the feeder. Additionally, even after the feed has been exhausted in the reservoir 12, the cap 32 allows for residual smells of the leftover feed particles remaining in the reservoir to be broadcast via the cap 32. This keeps animals interested in the feeder 10 well after the feed has been exhausted and before a user has a chance to refill the reservoir 12.

Figure 29:
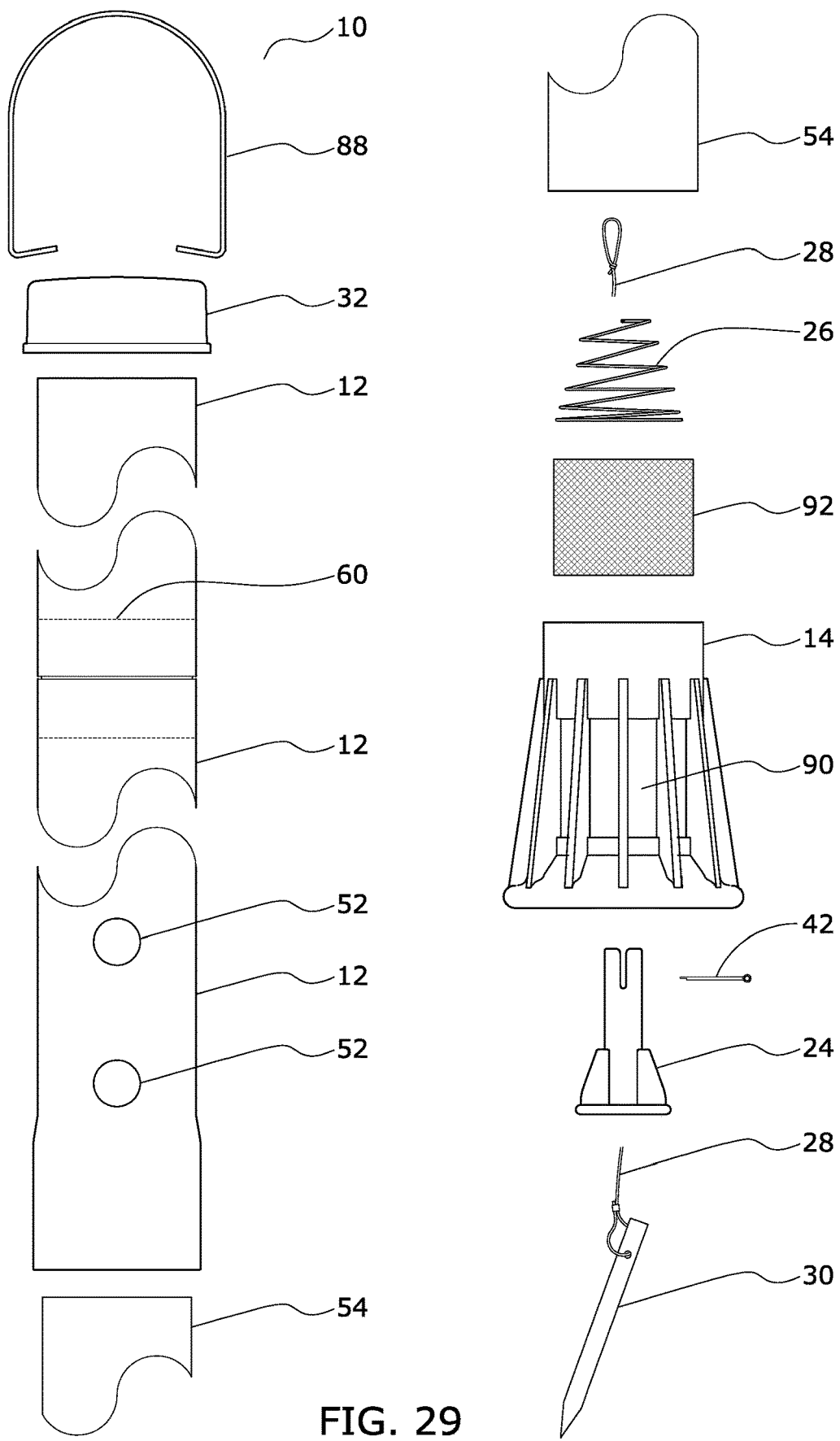
FIG. 29 is an exploded view of one embodiment of the feeder.

Referring now to FIG. 29, there is shown an alternate embodiment of the invention whereby the base 14 has a plurality of a base sidewall apertures 90. Also shown is a mesh sleeve 92 that is adapted to be inserted into the base 14 and come to rest on the annular seat 22. The mesh sleeve 92 in a preferred embodiment would be a stainless steel mesh sleeve 92 having apertures small enough to prevent feed from exiting the mesh apertures but strong and rigid enough to resist an animals chewing, clawing, bumping or hitting. This configuration allows for the feed to be visibly displayed to wildlife but protected from their advances. This configuration allows for the most scent possible to be broadcast through the air to local wildlife. While not shown in FIG. 29, an optional feed tray 62 and regulator 24 can be used in this embodiment as shown in other embodiments described and discussed herein in detail.

Figure 30:
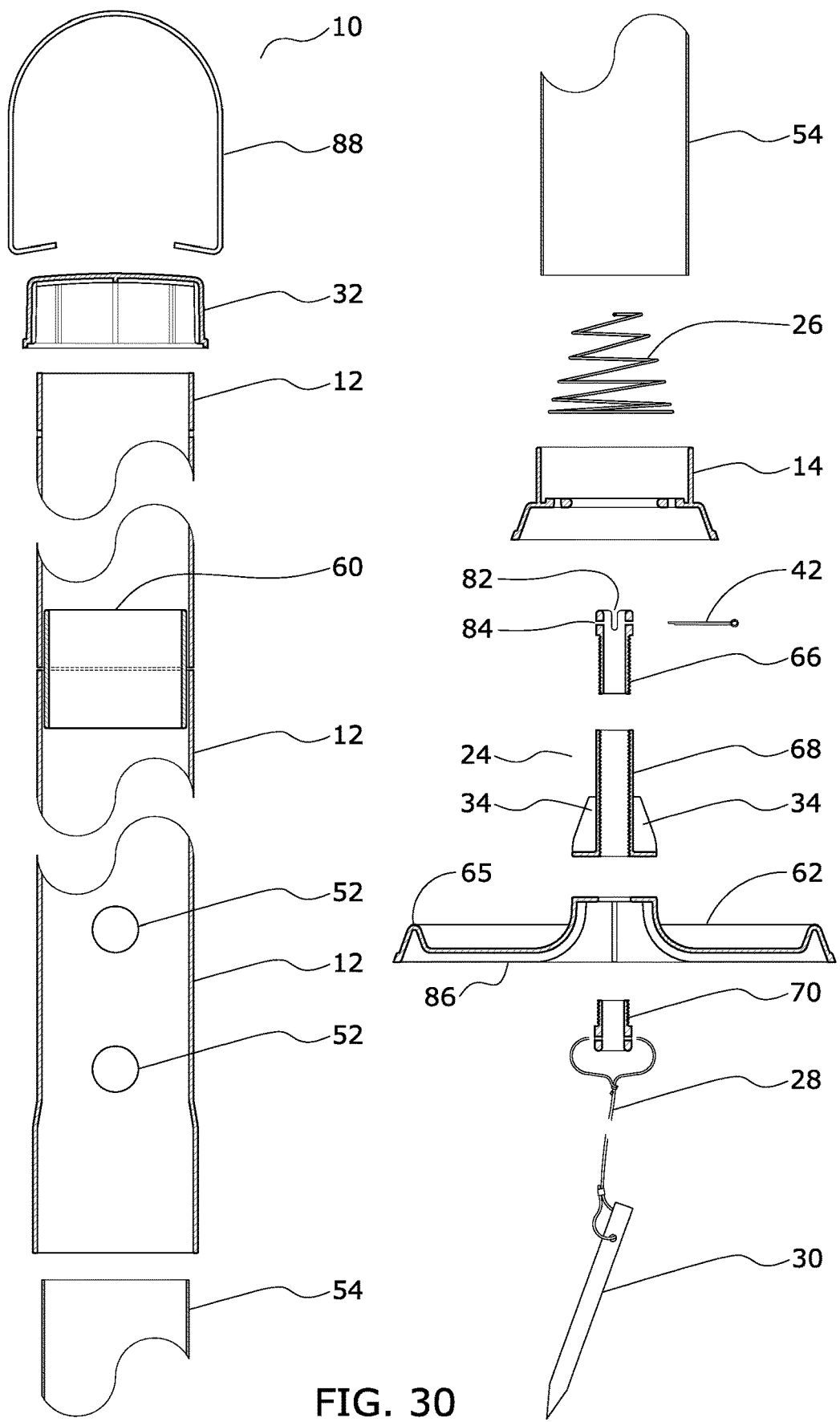
FIG. 30 is an exploded sectional view of a further embodiment of the feeder.

Referring now to FIG. 30, there is shown a further alternate embodiment of the feeder 10 whereby the regulator 24 is formed of a top portion 66, middle portion 68 and lower post portion 70 whereby the top portion 66 is threaded to receive a threaded middle portion 68 and the middle portion 68 is threaded to receive a threaded lower post portion 70. This design allows for ease of manufacturing such as by injection molding and or three-dimensional printing. The middle portion 68 is conical or frusto-conical and has longitudinal fluted channels 34 located on its perimeter. The top portion 66 has a slot 82 formed in its top and transverse apertures 84 formed in the upper sidewall of the top portion 66. Optionally, a threaded feed tray 62 can be inserted between the lower post portion 70 and the middle portion 68 and attached between by making a threaded connection. This gives a user versatility on what version of the feeder 10 they wish to deploy—a feeder without a feeding tray 62 or a feeder with an incorporated feed tray 62. This can be important depending on what animals are in the location where the feeder 10 is deployed. For example, in an area where there are plenty of squirrels or birds, the feed tray 62 would need to be incorporated because it gives a squirrels and birds, whose body weight is very small, enough leverage to actuate the regulator 24 by use of the feeding tray 62 as a lever. Optionally, if a user has a lot of racoons in the area they wish to deploy the feeder 10, they can subtract the feeding tray 62 as the raccoons will grab, climb and move the tether 28 to actuate the regulator 24 to release feed. The feeding tray 62 can be installed or removed even if the feeder is deployed with the regulator 24 under spring 26 compression. Using this or a similar approach of forming the regulator out of different parts will also help with costs associated with forming the regulator 24 and feed tray 62 due to less complex molds used in the injection molding process or smaller pieces formed by the three-dimensional printing process.

As can be shown from the description above and illustrated in FIGS. 1-30, there are many advantages to the present invention. One advantage is the long vertically geometric cylindrical shape of the feeder 10 and reservoir 12 whereby it can be camouflaged with paint or other coverings that can make it look like a tree. Small tree limbs with leaves can be attached to the feeder 10 by various means of attachment including string, zip ties, glue, adhesives among many other ways to fasten said camouflaging to the feeder 10 reservoir 12. In one embodiment, the reservoir 12 can hold anywhere from 30 to 50 pounds of corn which is directly tied to how much length of pipe is used for the reservoir 12. Another advantage to the present invention is the ability to adjust the feeder 10 in response to a wide variety of animal activity and responses in relation to the amount of feed metered out. First, the tension of the regulator 24 against the annular seat in relation to a particular animal and its force can be adjusted through inherent spring 26 tension by size of the spring 26, gauge of spring 26 wire or the amount of coils used in the spring 26 length. Tension of the spring 26 can further be adjusted by employing the various 44 apertures that descend the top portion of the regulator which creates varying tension in the spring. Second, certain animals such as small and medium sized animals can be restricted from their actuating the feeder 10 by vertically positioning the feeder 10 above their reach and substantially high enough to counteract any force the animal can exert against the tether 28 such that there is minimal lever advantage against the regulator 24. Third, the use of small diameter tether 28, smooth or slick tether 28, or very thin but strong tether 28 such as cable or high performance fishing lines can restrict certain animals such as racoons from grasping and climbing the tether 28 such that they cannot actuate the regulator 24. Fourth, using a combination tether 28 comprising a first portion that has frictional properties such as basic rope to allow an animal to climb the tether 28 a certain distance and then joining that portion of tether 28 to a smooth or slick tether 28 that prevents the animal from fully climbing the tether to reach the feeder 10 is another option to customize the feeder 10. Further, any combination or slight adjustment of the foregoing adjustment customizations can lead to a desired animal feeding regimen and result.

The feeder is installed by projecting the support line 11 over a substantial tree limb or a sufficiently leaning tree and attached to the bail 88. The feeder 10 is filled with a desired feed and the user inserts the cap 32 on the reservoir 12. The user then hoists the feeder to a desired level and ties the other end of the support line off to a tree, limb, root or other appropriate point of attachment including a manmade stake. The tether 28 is then attached the regulator 24 and pulled to a sufficient tension while simultaneously attaching to the stake 30. The the base 14, regulator 24 and feed tray 62 can be made through the methods such as injection molding, casting or three dimensional printing.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

The invention claimed is:

1. A wildlife feeder, comprising:
a reservoir;
a base adapted to be connected to said reservoir and said base having an upper opening, a lower opening and a hollow interior space wherein there is an annular seat;
a regulator adapted to be insertable into the lower opening of the base such that the regulator extends upwards into the hollow interior space of said base and abuts against the annular seat on the annular seat bottom edge;
a spring adapted to secure the regulator in the hollow interior space of the base;
a tether for attachment to said regulator on one end and a stake for attachment to the other end of said tether;
a cap for insertion onto a top of the reservoir; and
means for vertical suspension of the feeder.

2. The wildlife feeder of claim 1 wherein the regulator has a conical shape and has a plurality of longitudinal fluted channels.

3. The wildlife feeder of claim 1 wherein the spring is helical and tapered and the top terminal end of said helical spring is bent inwards at an angle that is generally 90 degrees to the helical path of the spring such that the terminal end terminates into a straight portion.

4. The wildlife feeder of claim 3 wherein the spring is secured to the regulator by installing the bottom end of the spring on the upper surface of the annular seat of the base adjacent to the lower opening and installing the straight portion of the spring on the top of the regulator into an upper slot located in the regulator, compressing the spring, and inserting a pin into an aperture formed into the regulator above the spring straight portion such that the spring is trapped below said pin and exerts an upward force on the regulator.

5. The wildlife feeder of claim 1 wherein the annular seat has weep holes, an annular channel on its outer perimeter and a plurality of scent apertures located throughout its surface.

6. The wildlife feeder of claim 1 further comprising at least one sight aperture located in a sidewall of the reservoir and a translucent or transparent tubular sleeve that is insertable into the upper opening of the base and nests in the annular channel.

7. The wildlife feeder of claim 1 wherein the cap has ribs on its inner surface such that they are adapted to apply a frictional connection to the top of the reservoir to maintain a tight connection while also allowing air to vent from the cap.

8. The wildlife feeder of claim 1 wherein the reservoir can be a unitary piece or it can be a plurality of reservoir sections joined together using couplings and means of securing said reservoir sections to said couplings.

9. The wildlife feeder of claim 1 wherein the regulator has a feed tray formed onto its lower surface such that the regulator and feed tray are a unitary piece and have a hollow vertical channel.

10. The wildlife feeder of claim 1 wherein the regulator is formed of a top portion, a middle portion that is conical in shape and having a plurality of longitudinal fluted channels on its outer surface, and a lower post portion whereby the top portion is threaded to receive a threaded middle portion and the threaded middle portion is threaded to receive a threaded lower post portion and the lower post portion is threaded to receive a threaded feed tray and whereby the top portion, the middle portion, the lower post portion and the feed tray all have a hollow longitudinal channel such that when they are installed one upon another there is formed a single hollow channel.

11. The wildlife feeder of claim 1 wherein the regulator is comprised of a tray portion having in its center a conical protruded portion extending upward having longitudinal fluted channels and an aperture in the conical protruded portion that is adapted to receive a tubular member having a slot in its upper end and a plurality of transverse apertures through said tubular member.

12. The wildlife feeder of claim 1 wherein the base has at least one aperture in a sidewall whereby a mesh cylinder can be inserted into the upper opening of said base to allow open visual an olfactory display of feed to wildlife while still retaining feed securely inside said base.

13. A wildlife feeder kit, comprising:
a base adapted to be connected to a user provided reservoir and said base having an upper opening, a lower opening and a hollow interior space wherein there is an annular seat; a regulator adapted to be insertable into the lower opening of the base such that the regulator extends upwards into the hollow interior space of said base and abuts against the annular seat on the annular seat bottom edge;
a spring adapted to secure the regulator in the hollow interior space of the base;
a tether for attachment to said regulator on one end and a stake for attachment to the other end of said tether; and
means for vertical suspension of the wildlife feeder.

14. The wildlife feeder kit of claim 13 wherein the regulator has a conical shape and has a plurality of longitudinal fluted channels.

15. The wildlife feeder kit of claim 13 further comprising and a vented cap for insertion onto a top of a user provided reservoir.

16. The wildlife feeder kit of claim 13 wherein the spring is helical and tapered and the top terminal end of said helical spring is bent inwards at an angle that is generally 90 degrees to the helical path of the spring such that the terminal end terminates into a straight portion.

17. The wildlife feeder kit of claim 16 wherein the spring is secured to the regulator by installing the bottom end of the spring on the upper surface of the annular seat of the base adjacent to the lower opening and installing the straight portion of the spring on the top of the regulator into an upper slot located in the regulator, compressing the spring, and inserting a pin into an aperture formed into the regulator above the spring straight portion such that the spring is trapped below said pin and exerts an upward force on the regulator.

18. The wildlife feeder kit of claim 13 wherein the annular seat has weep holes, an annular channel on its outer perimeter and a plurality of scent apertures located throughout its surface.

19. The wildlife feeder kit of claim 13 further comprising at least one sight aperture located in the sidewall of the reservoir and a translucent or transparent tubular sleeve that is insertable into the upper opening of the base and nests in the annular channel.

20. The wildlife feeder kit of claim 13 wherein the cap has ribs on its inner surface such that they are adapted to apply a frictional connection to the top of the reservoir to maintain a tight connection while also allowing air to vent from the cap.

21. The wildlife feeder kit of claim 13 wherein the regulator has a feed tray formed onto its lower surface such that they are a unitary piece and has a hollow vertical channel.

22. The wildlife feeder kit of claim 13 wherein the regulator is formed of a top portion, a middle portion that is conical in shape and having a plurality of longitudinal fluted channels on its outer surface, and a lower post portion whereby the top portion is threaded to receive a threaded middle portion and the threaded middle portion is threaded to receive a threaded lower post portion and the lower post portion is threaded to receive a threaded feed tray and whereby the top portion, the middle portion, the lower post portion and the feed tray all have a hollow longitudinal channel such that when they are installed one upon another there is formed a single hollow channel.

23. The wildlife feeder kit of claim 13 wherein the regulator is comprised of a tray portion having in its center a conical protruded portion extending upward having longitudinal fluted channels and an aperture in the conical protruded portion that is adapted to receive a tubular member that has a slot in its upper end and a plurality of transverse apertures through said tubular member.

24. The wildlife feeder kit of claim 13 wherein the base has at least one aperture in a sidewall whereby a mesh cylinder can be inserted into the upper opening of said base to allow open visual and olfactory display of feed to wildlife while still retaining feed inside said base.

* * * * *